United States Patent [19]

Harris

[11] Patent Number: 4,738,826

[45] Date of Patent: Apr. 19, 1988

[54] REAGENT METERING AND DELIVERY DEVICE

[76] Inventor: Arthur M. Harris, 133 Rocky Point, Palos Verdes Estates, Calif. 90274

[21] Appl. No.: 823,939

[22] Filed: Jan. 29, 1986

Related U.S. Application Data

[63] Continuation-in-part of Ser. No. 557,913, Dec. 5, 1983, abandoned.

[51] Int. Cl.⁴ .............................................. G01N 1/14
[52] U.S. Cl. ................................. 422/100; 73/864.62; 222/390; 422/102; 436/180
[58] Field of Search .................... 73/864.16, 864.62; 222/168, 333, 386, 390; 422/99, 100, 102; 436/180

[56] References Cited

U.S. PATENT DOCUMENTS

| | | | |
|---|---|---|---|
| 1,699,873 | 1/1929 | Brodsky | 222/390 X |
| 2,461,211 | 2/1949 | Guthrie | 222/390 X |
| 3,913,799 | 10/1975 | Davis, Jr. | 222/390 X |
| 3,941,131 | 3/1976 | Ogle | 604/232 X |

FOREIGN PATENT DOCUMENTS

| | | | |
|---|---|---|---|
| 221269 | 4/1910 | Fed. Rep. of Germany | 222/390 |
| 418116 | 12/1910 | France | 222/390 |
| 561892 | 10/1923 | France | 411/433 |
| 726063 | 5/1932 | France | 222/390 |
| 341278 | 1/1931 | United Kingdom | 222/390 |

Primary Examiner—Barry S. Richman
Assistant Examiner—Michael S. Gzybowski
Attorney, Agent, or Firm—James E. Brunton

[57] ABSTRACT

A precision reagent metering and delivery device including a threaded, disposable reagent container adapted to be threadably interconnected with a threaded base. The reagent container is provided with a fluid passageway leading to the exterior thereof. Sealably mounted within the reagent container is a plunger which is operably coupled with a stator disposed in the base so that rotation of the reagent container relative to the base will cause precisely predeterminable longitudinal movement of the plunger within the reagent container whereby the reagent within the container will be controllably forced out the fluid passageway in precisely determinable amounts.

25 Claims, 4 Drawing Sheets

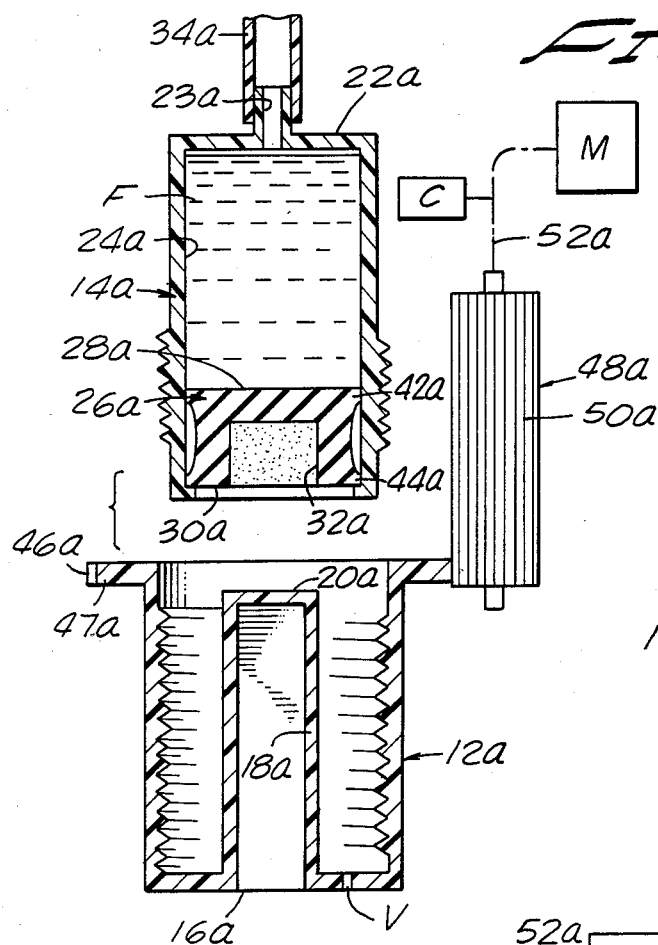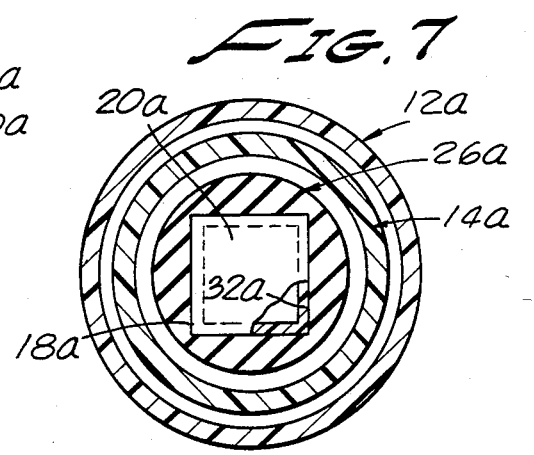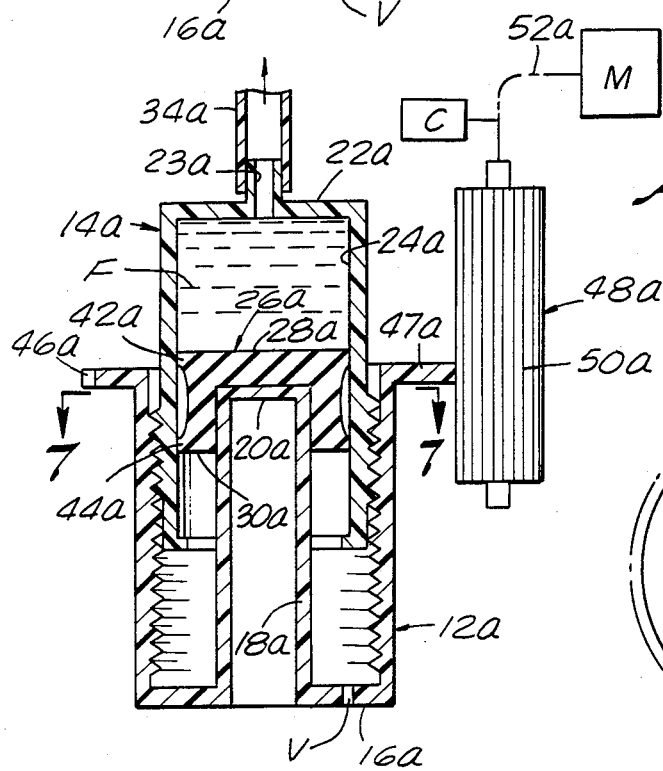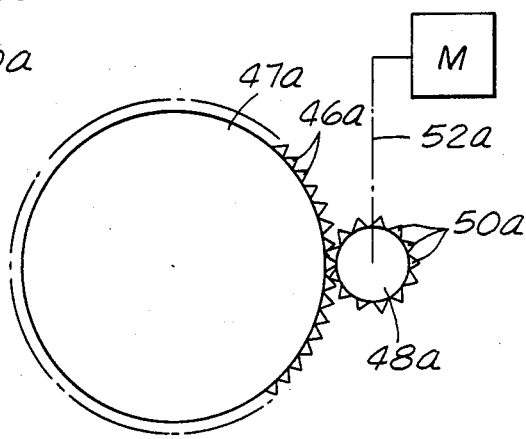

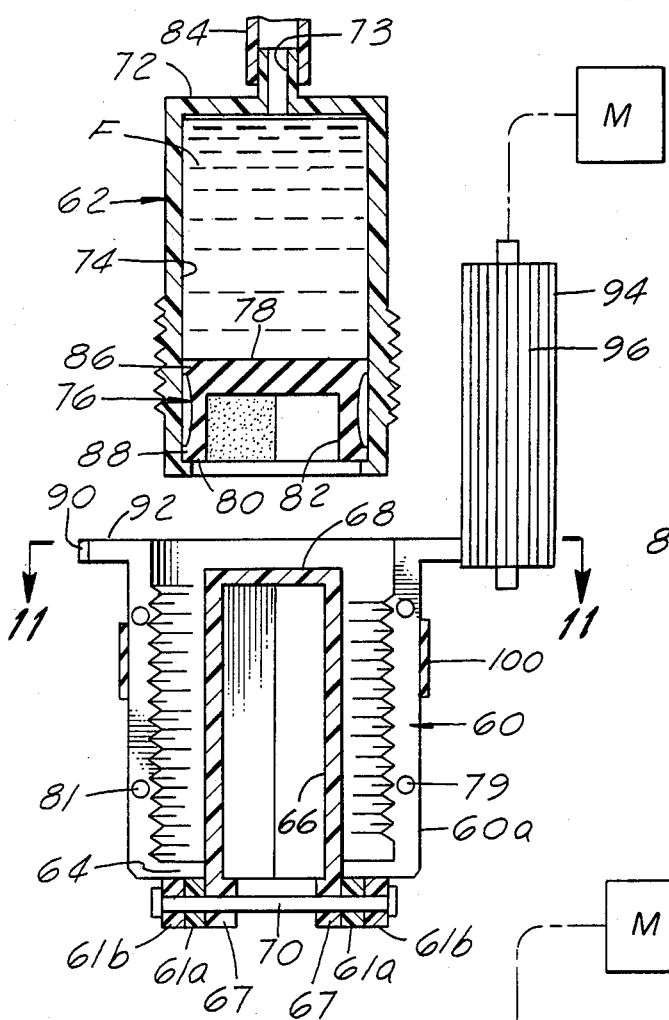
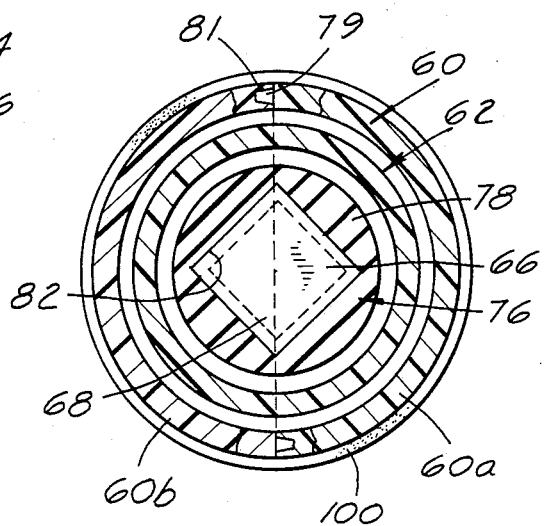
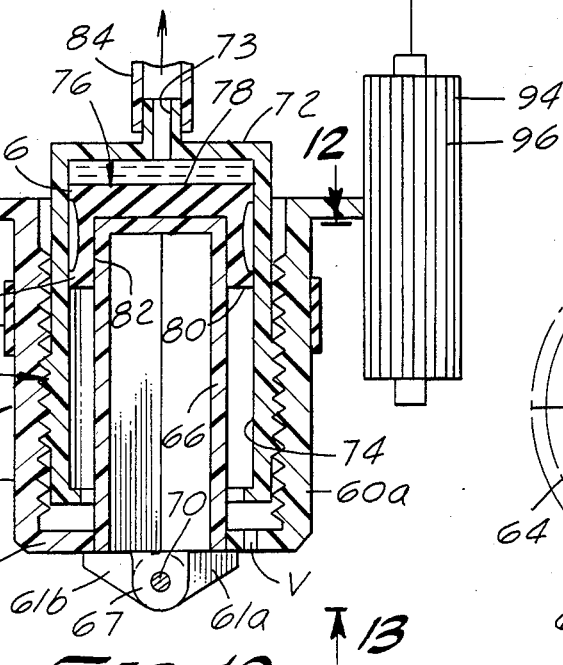
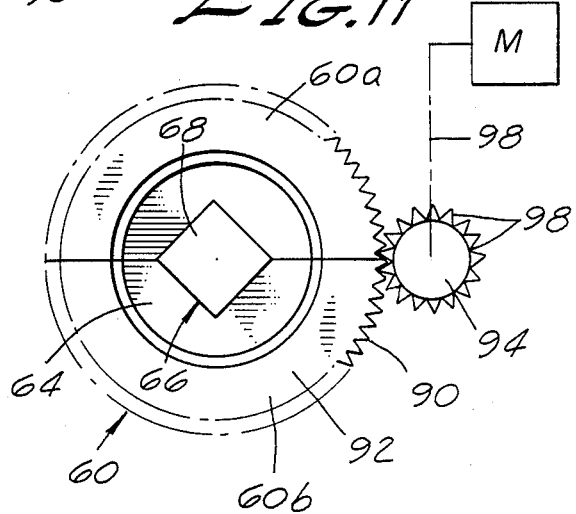

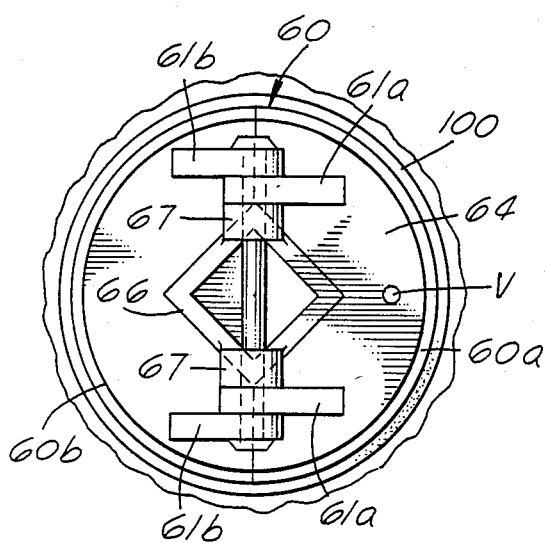
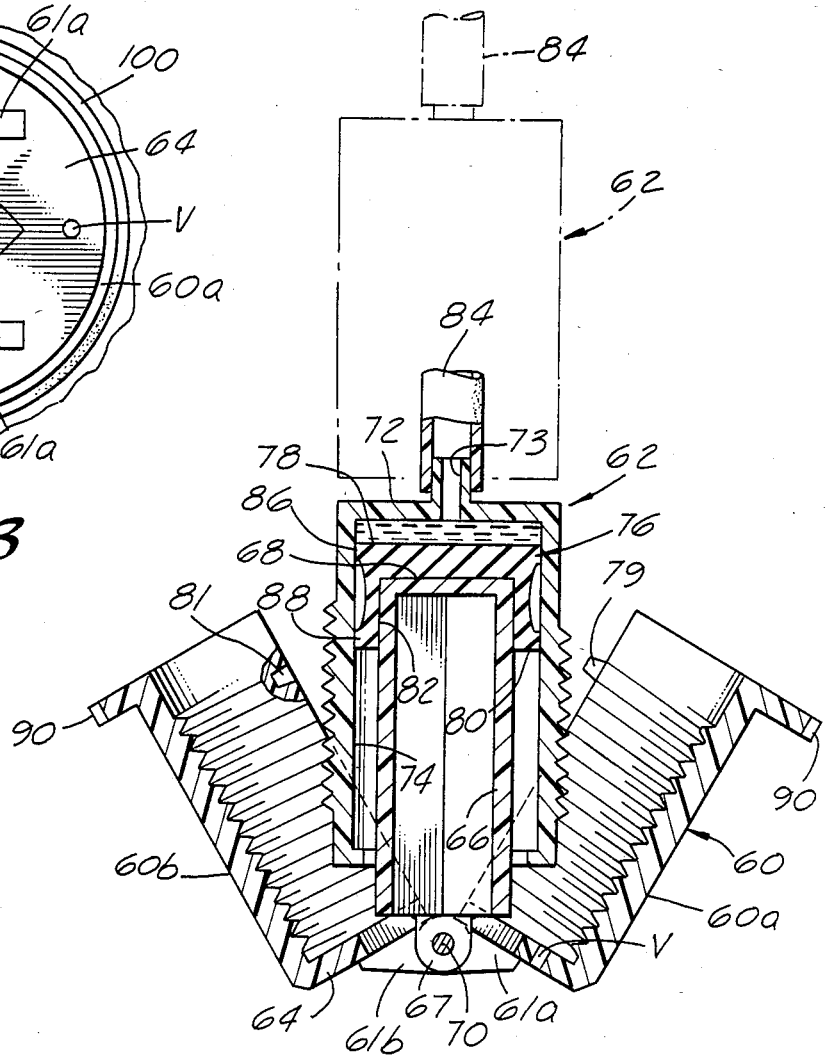
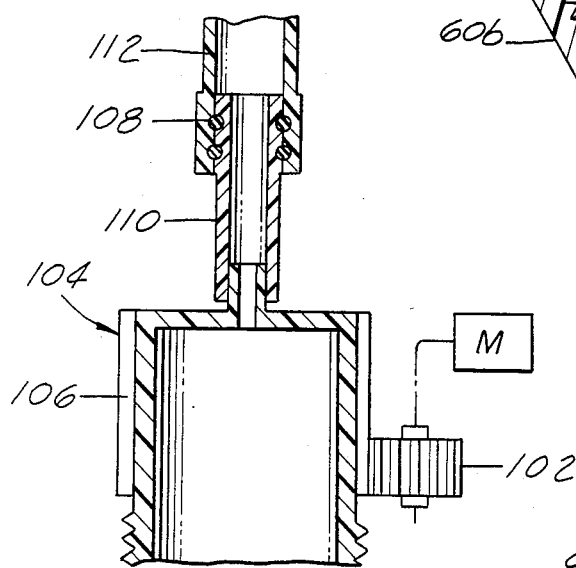
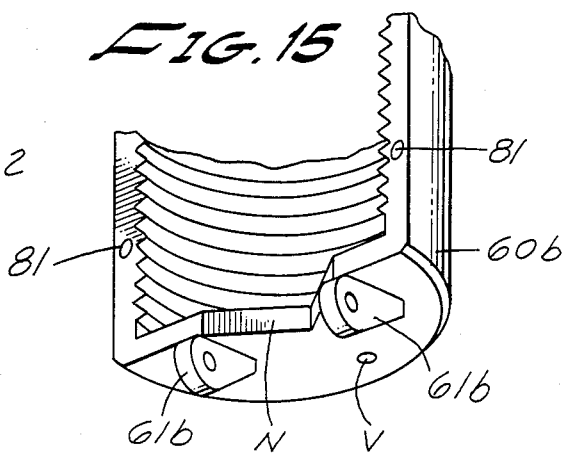

REAGENT METERING AND DELIVERY DEVICE

This is continuation-in-part application of application Ser. No. 557,916, filed Dec. 5, 1983, now abandoned.

BACKGROUND OF THE INVENTION

1. Field of the Invention

The present invention relates generally to liquid dispensing devices. More particularly the invention concerns an improved precision reagent metering and delivery device having a rotating base and a fixed reagent container.

2. Discussion of the Prior Art

There exists in the prior art a wide variety of volumetric devices for dispensing liquids such as reagents. On one end of the spectrum is the simple manual type, such as the pipette, wherein a quantity of liquid is sucked up into a graduated tube and then discharged as a metered quantity. On the other end of the spectrum are various highly sophisticated mechanical and electromechanical devices adapted to reproducably dispense precise quantities of liquid from conventional or specicially designed reagent containers. The manual type devices often lack the necessary precision, while the mechanized devices frequently are unduly complex, extremely costly and, in many instances, tend to fail or malfunction in continuous use.

The apparatus disclosed in U.S. Pat. Nos. 3,834,241 issued to Garren et al and in 4,054,061 issued to Valt are exemplary of manual type pipette devices.

The apparatus disclosed in U.S. Pat. Nos. 3,931,915 issued to Downings et al and in 4,101,283 issued to Sundstrom are exemplary of mechanical and electromechanical dispensing devices. The latter mentioned Sundstrom device is specifically adapted for use in accurately pipetting specified digitally programmed volumes of sample and the delivery of likewise specified, digitally programmed, volumes of reagent. The thrust of the Sundstrom invention is directed toward the provision of a specially constructed plunger which is rotated within a non-threaded reagent container. Rotation of the plunger is controlled by a relatively sophisticated light-photo cell system which is operably interconnected with motor means through somewhat complex counting and connecting circuits. As a result of the particular configuration of the Sundstrom plunger, it cuts grooves in the inner wall of the reagent container as it rotates.

One of the most successful reagent metering and dispensing devices developed to date is described in the co-pending application Ser. No. 557,913 filed by the present inventor.

The device of the present invention is an improvement of the device described in Ser. No. 557,913 and is readily distinguishable from the prior art in that it solves the problems inherent in the precision delivery of large or small liquid aliquots by providing inexpensive and positive a simple, inexpensive and positive acting, but yet highly precise device for accurate reagent metering and delivery. As will be appreciated from the description which follows, because of its simplicity, the device of the present invention is easy to maintain and clean, is highly reliable in operation and can readily be operated by unskilled, non-professional personnel.

SUMMARY OF THE INVENTION

It is a primary object of the present invention to provide a simple, highly reliable and easy to operate rotating base device which uniquely solves the problem of high precision and accuracy in reagent metering and delivery.

It is another object of the invention to provide a device of the aforementioned character in which the component parts which make up the device are of simple design and can be manufactured of inexpensive, easily fabricated and readily available materials.

Still another object of the invention is to provide a device of the character described in the previous paragraphs which is simple to clean and maintain.

A further object of the invention is to provide a device of the class described which makes use of disposable reagent containers which can be readily installed by non-professional personnel with minimum system downtime.

In summary, the device of the present invention comprises an externally threaded, disposable reagent container having a fluid passageway leading to the exterior of the device. The container is threadably receivable within an internally threaded rotatable base. Sealably mounted within the reagent container for reciprocal movement axially thereof is a uniquely designed plunger. The plunger is operably coupled with a stator disposed in the base so that rotation of the base relative to the reagent container will cause a precisely predeterminable axial movement of the plunger within the reagent container. This controlled axial movement of the plunger causes the reagent to be controllably forced out the fluid passageway of the container with great precision.

BRIEF DESCRIPTION OF THE DRAWINGS

FIG. 5 is an exploded, side-elevational, cross-sectional view of another form of the reagent metering and delivery device of the invention.

FIG. 6 is a view similar to FIG. 5, but showing the component parts of the device in a threadably mated relationship.

FIG. 7 is a cross-sectional view taken along lines 7—7 of FIG. 6.

FIG. 8 is a diagramatical plan view of the device of this form of the invention showing diagramatically one type of driving mechanism.

FIG. 9 is an exploded, side elevational, cross-sectional view of still another form of the reagent metering and delivery device of the present invention.

FIG. 10 is a view similar to FIG. 9 but showing the component parts of the device in a threadably mated relationship.

FIG. 11 is a view taken along lines 11—11 of FIG. 9.

FIG. 12 is a cross-sectional view taken along lines 12—12 of FIG. 10.

FIG. 13 is a view taken along lines 13—13 of FIG. 10.

FIG. 14 is a cross-sectional view similar to FIG. 10 but showing the base portion of the device pivoted into an open position to permit rapid removal of the reagent container.

FIG. 15 is a fragmentary, generally perspective view of one half of the base portion of the device.

FIG. 16 is a side elevational, cross-sectional view of yet another form of the reagent metering and delivery device of the invention.

DESCRIPTION OF THE INVENTION

Figure 1:
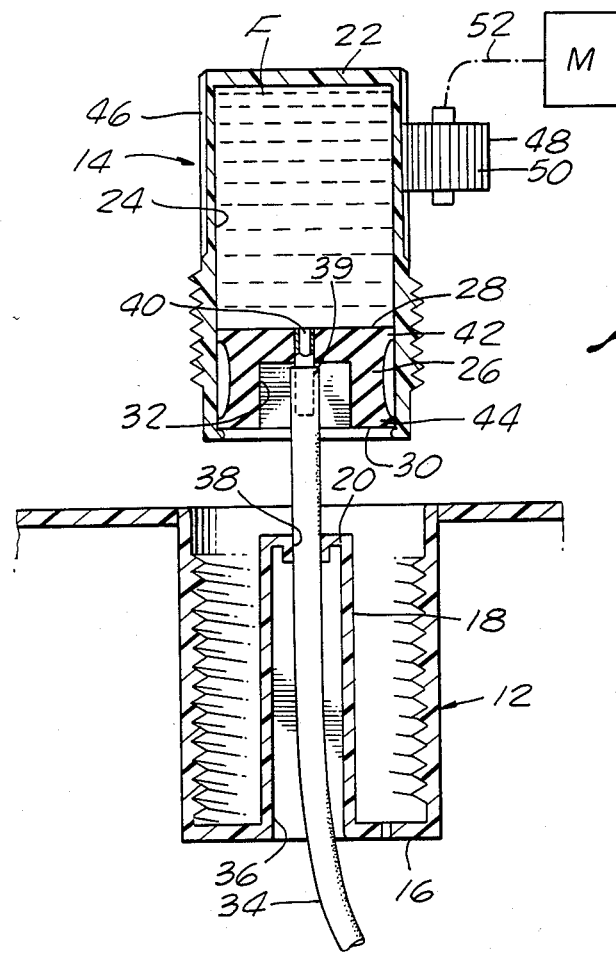
FIG. 1 is an exploded, side-elevational, cross-sectional view of the reagent metering and delivery device of the invention.
Figure 3:
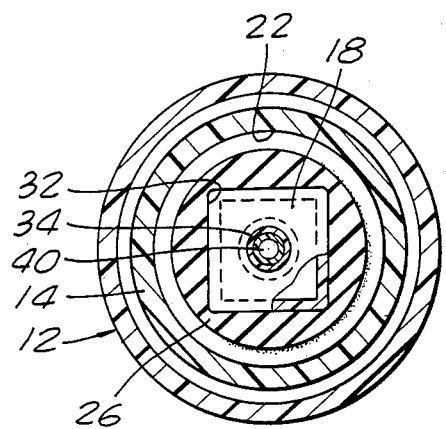
FIG. 3 is a cross-sectional view taken along lines 3—3 of FIG. 2.
Figure 2:
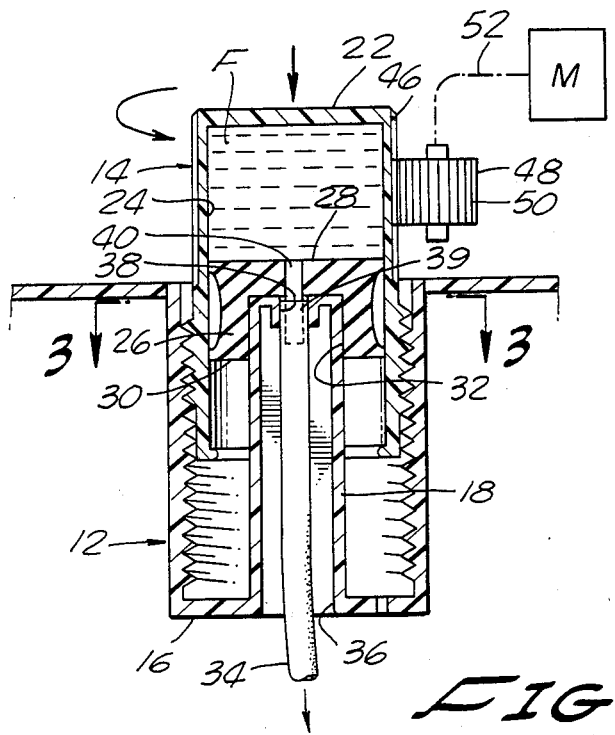
FIG. 2 is a view similar to FIG. 1, but showing the component parts of the device in a threadably mated relationship.

Referring to the drawings, and particularly to FIGS. 1 through 3, the reagent metering and delivery device of the present invention comprises a generally cylindrically shaped, internally threaded hollow base 12 and a generally cylindrically shaped, externally threaded reagent container 14 adapted to be threadably received within base 12. Base 12 includes a bottom closure wall 16 and a stator, shown here in the form of a hollow, upstanding column 18 mounted on wall 16 and extending axially upwardly within the hollow base 12 and terminating at an upper end portion 20.

As indicated in FIG. 2, reagent container 14 is adapted to be threadably interconnected with base 16 upon rotation of the container relative to the base. Rotation of container 14 may be accomplished manually, or, in a manner presently to be discussed, it may be accomplished by a mechanical drive means for controllably rotating the reagent cylinder relative to the base. The top of reagent container 14 is closed by a top closure wall 22 and the inner wall 24 of the container is generally cylindrical in shape.

Mounted for reciprocal movement within the reagent container 14 is a generally cylindrically shaped plunger 26 having upper and lower walls 28 and 30 respectively. Formed within bottom wall 30 of the plunger is connecting means for operably interconnecting the plunger with the stator, or upstanding column, 18 provided in base 12. In the embodiment of the invention shown in the drawings, this connecting means is provided in the form of a cavity 32 which, as shown in FIG. 3, is generally rectangular in cross-section and is adapted to closely receive the upper end portion 20 of upstanding column 18.

A fluid delivery means is provided for conducting fluid from the interior of reagent container 14 to the exterior of the device. This fluid delivery means is here provided in the form of a tubular conduit 34 which extends through an aperture 36 formed in bottom wall 16 of base 12. The conduit then extends upwardly through hollow column 18 and then outwardly through an aperture 38 formed in the upper portion 20 of the upstanding column 18 terminating in a first end 39. As best seen by referring to FIG. 1, plunger 26 is provided with a fluid passageway 40 having one end communicating with the interior of the reagent container 14 and the other end communicating with conduit 34.

To prevent leakage of fluid between plunger 26 and the inner cylindrical wall 24 of reagent container 14, plunger 26 is provided with sealing means adapted to sealably engage the inner wall 24 of the reagent container as the plunger moves reciprocally within the reagent container. In the present form of the invention, this sealing means comprises a pair of spaced apart, circumferentially extending skirts 42 and 44, the outer edges of which press resiliently against inner wall 24 of the reagent container. While sealing skirts are shown in the drawings, it is to be understood that conventional type elastomeric O-rings could also be used as the sealing means.

Figure 4:
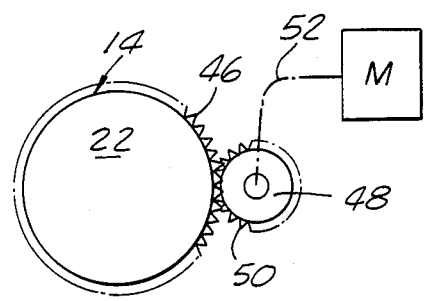
FIG. 4 is a diagramatical plan view of the device of the invention showing diagramatically one type of driving mechanism.

As best seen by also referring to FIG. 4, the drive means of the present form of the invention comprises a multiplicity of splines 46 provided about the periphery of the reagent container 14. A drive roller 48, also having a multiplicity of splines 50 provided about its periphery, is adapted to mateably engage and controllably drive the reagent container 14. A motor means M is operably interconnected with drive roller 48 by a suitable driving connection shown schematically in the drawings and indicated by the numeral 52. Depending upon the end use to be made of the device of the invention, the drive means may take any number of forms well known to those skilled in the art. For example, it may comprise a portable driving mechanism including a housing within which drive roller 48 is rotatably carried. In this instance, the drive roller can, if desired, be interconnected with motor M by a flexible shaft. Alternatively the drive means may be fixed and include a housing fixedly mounted in close proximity to reagent container 14 with drive roller 48 carried therewithin and adapted to be driven by a suitable drive train interconnected with motor M. The design of driving means of character described are well within the skill of the art and their precise construction need not be described herein.

In operation, when the parts are mated in the manner shown in FIG. 2, rotation of reagent container 14 relative to the base 12 will cause the reagent container to travel downwardly in relation to plunger 26, which is fixed against rotation by the stator.

Since the sealing means, or skirts 42 and 44, provided on plunger 26 prevents the fluid F contained within container 14 from passing between the plunger and the inner wall 24 of the container, the fluid will be forced outwardly of the device through delivery tube 34. The amount of fluid passing through the delivery tube is precisely proportioned to the travel of container 14 along the internal threads of base 12 as container 14 is rotated by the drive means. Accordingly, by closely controlling the rotation of the container 14 the delivery of the fluid from the device can be precisely and accurately controlled. More specifically by providing very fine threads on the mating parts and through close control of the drive means, high precision and accuracy in the delivery of small or large liquid aliquots can consistently be achieved.

Because the device embodies a minimum number of moving parts and due to the fact that the drive means is external of the unit and easily accessible, the device is highly reliable, readily maintainable and simple to operate.

Referring to FIGS. 5 through 7, an alternate form of the invention is shown. The reagent metering and delivery device of the this form of the invention is similar in many respects to that illustrated in FIGS. 1 through 4. However, in this alternate embodiment the fluid delivery means comprises a tubular member connected to the top wall of the fluid container. As in the previously described form of the invention, the apparatus comprises a generally cylindrically shaped, internally threaded hollow base 12a and a generally cylindrically shaped, externally threaded reagent container 14a. Base 12a includes a bottom closure wall 16a and a stator, shown here in the form of a hollow, upstanding column 18a mounted on wall 16a and extending axially upwardly within the hollow base 12a and terminating at an upper end portion 20a.

As indicated in FIG. 6, base 12a is adapted to be threadably interconnected with container 16a upon rotation of the base relative to the container. Rotation of base 12a may be accomplished manually, or, in a manner presently to be discussed, it may be accomplished by a mechanical drive means for controllably rotating the base relative to the reagent container 14a. The top of reagent container 14a is closed by a top closure wall 22a which is provided with a fluid passageway 23a leading to the exterior of the device. In this form of the invention the inner wall 24a of the container is generally cylindrical in shape.

Mounted for reciprocal, or axial, movement within the reagent container 14a is a generally cylindrically shaped plunger 26a having upper and lower walls 28a and 30a respectively. Formed within bottom wall 30a of the plunger is connecting means for operably interconnecting the plunger with the stator, or upstanding column, 18a provided in base 12a. In the embodiment of the invention shown in the drawings, this connecting means is provided in the form of a cavity 32a which, as shown in FIG. 7, is generally rectangular in cross-section and is adapted to closely receive the upper end portion 20a of upstanding column 18a.

A fluid delivery means is provided for conducting fluid from the interior of reagent container 14a to the exterior of the device. This fluid delivery means is here provided in the form of a tubular conduit 34a which is suitable interconnected with fluid passageway 23a.

To prevent leakage of fluid between plunger 26a and the inner cylindrical wall 24a of reagent container 14a, plunger 26a is provided with sealing means adapted to sealably engage the inner wall 24a of the reagent container as the plunger moves reciprocally within the reagent container. In the present form of the invention, this sealing means comprises a pair of axially spaced apart, circumferentially extending skirts 42a and 44a, the outer edges of which press resiliently against inner wall 24a of the reagent container. While sealing skirts are shown in the drawings, it is to be understood that conventional type elastomeric O-rings could also be used as the sealing means.

As best seen by also referring to FIG. 8, the drive means of the present embodiment of the invention comprises a multiplicity of splines 46a formed about the periphery of a flange 47a provided at the upper end of base 12a. A drive roller 48a, also having a multiplicity of splines 50a provided about its periphery, is adapted to mateably engage and controllably drive the base 12a. A motor means M is operably interconnected with drive roller 48a by a suitable driving connection shown schematically in the drawings and indicated by the numeral 52a. Depending upon the end use to be made of the device of the invention, the drive means may take any number of forms well known to those skilled in the art. For example, it may comprise a portable driving mechanism including a housing within which drive roller 48a is rotatably carried. In this instance, the drive roller can, if desired, be interconnected with motor M by a flexible shaft. Alternatively the drive means may be fixed and include a housing fixedly mounted in close proximity to base 12a with drive roller 48a carried therewithin and adapted to be driven by a suitable drive train interconnected with motor M. Of course, the base may also be rotated by hand. The design of driving means of character described are well within the skill of the art and their precise construction need not be described herein.

In operation, when the parts are mated in the manner shown in FIG. 6, rotation of base 12a relative to the non-rotating container 14a will cause the base 12a to travel upwardly in relation to plunger 26a, which is operably connected to the stator 18a.

Since the sealing means, or skirts 42a and 44a, provided on plunger 26a prevents the fluid F contained within container 14a from passing between the plunger and the inner wall 24a of the container, the fluid will be forced outwardly of the device through delivery tube 34a. The amount of fluid passing through the delivery tube is precisely proportioned to the travel of base 12a along the threads of container 14a as base 12a is rotated by the drive means. Accordingly, by closely controlling the rotation of the base 12a the delivery of the fluid from the device can be precisely and accurately controlled. More specifically by providing very fine threads on the mating parts and through close control of the drive means, high precision and accuracy in the delivery of small or large liquid aliquots can consistently be achieved. As best seen in FIG. 6, a vent "V" is formed in bottom wall 16a to permit venting of the base during operation of the device.

Another important feature of the present form of the invention comprises counter means for measuring the extent of rotation of base 12a relative to container 14a and for providing an automatic readout of the fluid dispensed. It is apparent that the travel of the plunger 26a is directly proportional to the extent of rotation of the base relative to the container. It is equally apparent that the amount of fluid dispensed is directly proportional to the degree of travel of the plunger within the container. Accordingly, by measuring with a suitable counter "C" the extent of rotation of the base relative to the container the amount of fluid dispensed can readily be calculated in a manner well known to those skilled in the art. The calculations of fluid dispensed as well as the instrumentation required to provide a direct readout thereof are well understood and will not be discussed in detail herein.

Because the device embodies a minimum number of moving parts and due to the fact that the drive means is external of the unit and easily accessible, the device is highly reliable, readily maintainable and simple to operate.

Referring now to FIGS. 9 through 12, still another form of the reagent metering and delivery device of the invention comprises a generally cylindrically shaped, internally threaded hollow base 60 and a generally cylindrically shaped, externally threaded reagent container 62. In this form of the invention base 60 is made up of two hingably interconnected parts 60a and 60b (FIG. 15) which, in the closed position shown in FIG. 10 define a bottom closure wall 64 and a stator, shown here in the form of a hollow, upstanding column 66 extending axially upwardly within the hollow base 60 and terminating at an upper end portion 68.

Turning also to FIGS. 13, 14 and 15, parts 60a and 60b are provided with downwardly depending, transversely spaced ears 61a and 61b respectively. These ears are constructed so as to mate in the manner shown in FIG. 13 and each is apertured to receive a pivot pin 70 which extends through the apertured ears and about which the parts pivot into the open position shown in FIG. 14. As will be discussed more fully hereinafter, this novel pivoting feature permits the rapid removal of the reagent container after the reagent has been ejected therefrom. Provided proximate the lower extremity of stator 66 are spaced apart apertured ears 67 through which pin 70 also passes in the manner shown in FIG. 9. With this arrangement the stator and the clam shell-like base portions 60a and 60b are interconnected to form the base assembly of the device, which in the closed position, operates in basically the same manner as base 12a of the previously described embodiment.

As best seen in FIG. 10, when the portions 60a and 60b are in the closed position, base 60 is adapted to be threadably interconnected with container 62 upon rotation of the base relative to the container. Rotation of base 60 may be accomplished manually, or, as in the case of the previously described embodiment, it may be accomplished by a mechanical drive means for controllably rotating the base relative to the reagent container 62. The top of reagent container 62 is closed by a top closure wall 72 which is provided with a fluid passageway 73 leading to the exterior of the device. In this form of the invention the inner wall 74 of the container is generally cylindrical in shape.

Mounted for reciprocal, or axial, movement within the reagent container 62 is a generally cylindrically shaped plunger 76 having upper and lower walls 78 and 80 respectively. Formed within bottom wall 80 of the plunger is connecting means for operably interconnecting the plunger with the stator, or upstanding column, 66 provided in base 60. In this embodiment of the invention, like that previously described, the connecting means is provided in the form of a cavity 82 which, as shown in FIG. 12, is generally rectangular in cross-section and is adapted to closely receive the upper end portion 68 of upstanding column 66.

A fluid delivery means is provided for conducting fluid from the interior of reagent container 62 to the exterior of the device. This fluid delivery means is here provided in the form of a tubular conduit 84 which is suitable interconnected with fluid passageway 73.

To prevent leakage of fluid between plunger 76 and the inner cylindrical wall 74 of reagent container 62, plunger 76 is provided with sealing means adapted to sealably engage the inner wall 74 of the reagent container as the plunger moves reciprocally within the reagent container. In the present form of the invention, this sealing means comprises a pair of axially spaced apart, circumferentially extending skirts 86 and 88, the outer edges of which press resiliently against inner wall 74 of the reagent container.

As best seen by also referring to FIG. 11, the drive means of the present embodiment of the invention comprises a multiplicity of splines 90 formed about the periphery of a flange 92 provided at the upper end of base 62. A drive roller 94, also having a multiplicity of splines 96 provided about its periphery, is adapted to mateably engage and controllably drive the base 62. A motor means M is operably interconnected with drive roller 94 by a suitable driving connection shown schematically in the drawings and indicated by the numeral 98. As previously discussed, depending upon the end use to be made of the device of the invention, the drive means may take any number of forms well known to those skilled in the art.

In operation, when base portions 60a and 60b are closed and the parts are mated in the manner shown in FIG. 10, rotation of base 60 relative to the non-rotating container 62 will cause the base 60 to travel upwardly in relation to plunger 76, which is operably connected to the stator 66.

Since the sealing means, provided on plunger 76 prevents the fluid F contained within container 64 from passing between the plunger and the inner wall 74 of the container, the fluid will be forced outwardly of the device through delivery tube 84. The amount of fluid passing through the delivery tube is precisely proportioned to the travel of base 60 along the threads of container 62 as base 60 is rotated by the drive means. Accordingly, by closely controlling the rotation of the base 60 the delivery of the fluid from the device can be precisely and accurately controlled. As best seen in FIG. 10, an air vent "V" is formed in the bottom wall 64 to permit venting of the device during operation.

Referring again to FIGS. 9 and 10, the base portions 60a and 60b are maintained in a closed position by a band 100 which circumscribes the base assembly. When the fluid within container 62 has been ejected, the band 100 is removed and the base portions are opened in the manner shown in FIG. 14. This permits the spent container to be quickly discarded without the necessity of threadably disconnecting it from the base as is required in the embodiment of the invention shown in FIGS. 5 through 8. The base portions are then pivoted to the closed position shown in FIG. 10 and the band 100 is replaced. Protuberances 79 which are receivable in mateing cavities 81 formed in portion 60b (FIG. 14) function to precisely align the base portions and a notched-out portion "N" in the base portions receives the stator (FIG. 15). A new container can then be mated with the base assembly and the fluid dispensing operation repeated.

Turning to FIG. 16, yet another form of the invention is there shown. In this embodiment, the various component parts of the invention are of the same general configuration as previously described, save that here the base is held fixed and the container is rotated relative thereto by a motor M which is drivably coupled with splined drive 102. In this instance, the container 104 is provided with splines 106 which are adapted to mate with drive 102. Additionally, a swivel assembly 108 is provided to interconnect the supporting tube 110, which is connected to container 104 with a non-rotating supply conduit 112.

Having now described the invention in detail in accordance with the requirements of the patent statutes, those skilled in this art will have no difficulty in making changes and modifications in the individual parts of their relative assembly in order to meet specific requirements or conditions. Such changes and modifications may be made without departing from the scope and spirit of the invention, as set forth in the following claims.

I claim:

1. A reagent metering and delivery device comprising:
   (a) a threaded hollow base member having a bottom closure wall;
   (b) a rigid stator mounted within said base member;
   (c) a threaded reagent container adapted to be threadably interconnected with said base member, said container having a top closure wall and a generally cylindrical inner wall;
   (d) fluid delivery means for conducting fluid from the interior of said reagent container to the exterior of the device; and (e) a plunger captively disposed within said reagent container and reciprocally movable a precise axial distance within said reagent container only upon rotation of said reagent container relative to said base member, said plunger being non-rotational relative to said base member but being simultaneously movable rotationally and axially relative to said reagent container and including a fluid passageway having one end communicating with the interior of said reagent container and another end communicating with said fluid delivery means, said plunger having:
  (i) sealing means adapted to sealably engage said inner wall of said reagent container for preventing leakage of fluid between said plunger and said inner wall upon non-rotatable axial movement of said plunger within said reagent container; and
  (ii) connecting means for operably interconnecting said plunger with said stator for preventing rotation of said plunger relative to said inner wall of said base member upon rotation of said reagent container relative to said base member.

2. A reagent metering and delivery device as defined in claim 1 in which said stator is hollow and said fluid delivery means comprises a tubular conduit communicating with said fluid passageway of said plunger and extending through said hollow stator to the exterior of said base member.

3. A reagent metering and delivery device as defined in claim 1 in which said sealing means comprises at least one resilient annular skirt formed on the periphery of said plunger, an outer edge of which presses resiliently against said inner wall of said reagent container for sealable engagement with said inner wall upon axial movement of said plunger.

4. A reagent metering and delivery device as defined in claim 1 including drive means for controllably rotating said reagent container relative to said base member.

5. A reagent metering and delivery device as defined in claim 1 in which said stator comprises a hollow, upstanding column mounted centrally in said hollow base member and in which said connecting means comprises a cavity formed in said plunger adapted to receive an upper end of said column.

6. A reagent metering and delivery device as defined in claim 5 in which both said upstanding column and said cavity in said plunger are non-circular in cross-section.

7. A reagent metering and delivery device comprising:
  (a) a generally cylindrically shaped, internally threaded hollow base member having a bottom closure wall provided with a centrally disposed aperture;
  (b) a rigid hollow upstanding column fixedly mounted on said bottom closure wall and extending axially upwardly within said hollow base member terminating in an upper end portion;
  (c) a tubular conduit extending through said aperture in said bottom closure wall, upwardly through said hollow upstanding column and terminating in a first end;
  (d) a generally cylindrically shaped, externally threaded disposable reagent container adapted to be threadably received within said hollow base member, said reagent container having a top closure wall and a generally cylindrical inner wall;
  (e) a generally cylindrically shaped plunger having an upper and a lower wall, said plunger being captively carried in and simultaneously reciprocally and rotatably movable relative to said reagent container upon rotation of said reagent container relative to said base member and including a fluid passageway having one end communicating with the interior of said reagent container and another end adapted to be interconnected with said first end of said tubular conduit, said plunger having:
    (i) sealing means comprising at least one resilient, circumferentially extending skirt formed on the periphery of said piston, an outer edge of which presses resiliently against said inner wall of said reagent container; and
    (ii) connecting means for operably interconnecting said plunger with said upstanding column for preventing rotation of said plunger relative to said inner wall of said base member upon rotation of said reagent container relative to said base member, said connecting means comprising a cavity formed in said lower wall of said plunger adapted to receive said upper end portion of said column; and
  (f) drive means for rotating said reagent container relative to said base member.

8. A reagent metering and delivery device as defined in claim 7 in which both said cavity and said upper end portion of said column are generally rectangular in cross-section.

9. A reagent metering and delivery device as defined in claim 7 in which said drive means comprises a plurality of splines formed on said reagent container; a drive member adapted to drivably engage said splines; and motor means for driving said drive member.

10. A reagent metering and delivery device for delivering precise quantities of reagent from a disposable reagent container comprising:
  (a) an internally threaded hollow base member having a bottom closure wall;
  (b) a hollow stator rigidly mounted within said base member;
  (c) an externally threaded disposable reagent container adapted to be threadably interconnected with said base member upon rotation of said reagent container relative to said base member, said reagent container having a top closure wall and a generally cylindrical inner wall;
  (d) fluid delivery means for conducting fluid from the interior of said reagent container to the exterior of the device; and
  (e) a non-rotatable plunger captively carried in and reciprocally movable within said reagent container a precise, predetermined axial distance only upon rotation of said reagent container relative to said base member, said plunger including a fluid passageway having one end communicating with the interior of said reagent container and another end communicating with said fluid delivery means, said fluid delivery means comprising a tubular member communicating with said fluid passageway of said plunger and extending through said hollow stator to the exterior of said base member and, said plunger having:
    (i) sealing means adapted to sealably engage said inner wall of said reagent container for preventing leakage of fluid between said plunger and said inner wall upon axial movement of said plunger within said reagent container; and (ii) connecting means for removably interconnecting said plunger with said stator for preventing rotation of said plunger relative to said inner wall of said base member upon rotation of said reagent container relative to said base member;

said reagent container and said plunger captively carried therein being separable as a unit from said base member and said stator.

11. A reagent metering and delivery device comprising:
(a) a threaded hollow base member having a bottom closure wall;
(b) a rigid stator mounted within said base member;
(c) a threaded reagent container adapted to be threadably interconnected with said base member upon relative rotation between said base member and said reagent container, said reagent container having an inner wall and a top closure wall provided with a fluid passageway; and
(d) a non-rotatable plunger captively disposed within said reagent container and reciprocally movable a precise axial distance therewithin upon rotation of said base member relative to said reagent container, said plunger having:
  (i) sealing means adapted to sealably engage said inner wall of said reagent container for preventing leakage of fluid between said plunger and said inner wall upon non-rotatable axial movement of said plunger within said reagent container; and
  (ii) connecting means for operably interconnecting said plunger with said stator for preventing rotation of said plunger relative to said stator but permitting simultaneous axial and rotational movement of said plunger relative to said reagent container.

12. A reagent metering and delivery device as defined in claim 11 including a conduit interconnecting said fluid passageway of said reagent container with the exterior of said reagent container.

13. A reagent metering and delivery device as defined in claim 11 in which said stator comprises an upstanding column mounted centrally in said hollow base member and in which said connecting means comprises a cavity formed in said plunger adapted to receive an upper end of said column.

14. A reagent metering and delivery device as defined in claim 13 in which said base member, said plunger and said container are generally circular in cross-section and in which both said upstanding column and said cavity in said plunger are non-circular in cross-section.

15. A reagent metering and delivery device as defined in claim 14 in which said sealing means comprises at least one resilient annular skirt formed on the periphery of said plunger, an outer edge of which presses resiliently against said inner wall of said reagent container.

16. A reagent metering and delivery device as defined in claim 14 including drive means for controllably rotating said base member relative to said reagent container and means for measuring the extent of rotation of said base member relative to said reagent container whereby the amount of fluid dispensed can be determined.

17. A reagent metering and delivery device comprising:
(a) a base assemblage including first and second pivotally interconnected, internally threaded base portions movable from a first closed position wherein said base portions cooperate to define a generally cylindrically shaped internally threaded base assemblage having a bottom wall, to a second open position wherein said base portions are spaced apart;
(b) a stator mounted within said base assemblage;
(c) a threaded reagent container adapted to be threadably interconnected with said base assemblage in said first closed position upon rotation of said base assemblage relative to said reagent container, said reagent container having an inner wall and a top closure wall provided with a fluid passageway; and
(d) a plunger reciprocally movable within said reagent container, said plunger being captively disposed within said reagent container and having:
  (i) sealing means adapted to sealably engage said inner wall of said reagent container for preventing leakage of fluid between said plunger and said inner wall; and
  (ii) connecting means for operably interconnecting said plunger with said stator for preventing rotation of said plunger relative to said stator;

said reagent container and said plunger being separable as a unit from said base assemblage.

18. A reagent metering and delivery device as defined in claim 17 in which each of said first and second base portions is provided with spaced apart ears extending from said bottom wall, each of said ears having an aperture therethrough and in which said base portions are adapted to pivot from said first closed position to said second open position about an axis extending through said apertures formed in said ears.

19. A reagent metering and delivery device as defined in claim 18 in which said stator includes spaced apart bosses each having an aperture therethrough adapted to align with the apertures formed in said ears.

20. A reagent metering and delivery device as defined in claim 19 including a pivot pin adapted to be received within the apertures of said bosses and the apertures of said ears whereby said first and second base portions will move pivotally about said pivot pin from said first closed position to said second open position.

21. A reagent metering and delivery device comprising:
(a) a generally cylindrically shaped, internally threaded hollow base member having a bottom closure wall;
(b) a rigid upstanding column mounted on said bottom closure wall and extending axially upwardly within said hollow base member terminating in an upper end portion;
(c) a generally cylindrically shaped, externally threaded reagent container adapted to be threadably received within said hollow base member, said reagent container having a generally cylindrical inner wall and a top closure wall provided with a fluid passageway therethrough;
(d) a generally cylindrically shaped plunger captively disposed within said reagent container and having an upper and a lower wall, said plunger being reciprocally movable within said reagent container, said plunger having:
  (i) sealing means comprising at least one resilient, circumferentially extending skirt formed on the periphery of said plunger, an outer edge of which presses resiliently against said inner wall of said reagent container for sealable interconnection therewith upon axial movement of said plunger and (ii) connecting means for interconnecting said plunger with said upstanding column for preventing rotation of said plunger relative to said inner wall of said base upon rotation of said base relative to said reagent container, said connecting means comprising a cavity formed in said lower wall of said plunger adapted to closely receive said upper end portion of said column; and (f) drive means for rotating said base relative to said reagent container.

22. A reagent metering and delivery device as defined in claim 21 in which both said cavity and said upper end portion of said column are generally rectangular in cross-section.

23. A reagent metering and delivery device as defined in claim 21 in which said base member includes a flange portion having a plurality of splines formed thereon; and in which said drive means comprises a drive member adapted to drivably engage said splines and motor means for driving said drive member.

24. A reagent metering and delivery device comprising:

(a) a generally cylindrically shaped, internally threaded non-rotatable hollow base member having a bottom wall;

(b) an upstanding rigid column mounted on said bottom wall and extending axially upwardly within said base member terminating in an upper end portion;

(c) a generally cylindrically shaped, externally threaded reagent container adapted to be threadably received within said hollow base, said reagent container having a generally cylindrical inner wall, an outer wall, a top closure wall provided with a fluid passageway therethrough and a plurality of circumferentially spaced splines provided on said outer wall;

(d) a generally cylindrically shaped plunger captively disposed within said reagent container and having an upper and a lower wall, said plunger being simultaneously reciprocally and rotationally movable relative to said reagent container, said plunger having:

(i) sealing means adapted to sealably engage said inner wall of said reagent container for preventing leakage of fluid between said plunger and said inner wall upon axial movement of said plunger and (ii) connecting means for operably interconnecting said plunger with said upstanding column for preventing rotation of said plunger relative thereto; and (e) drive means including a rotatable drive means having circumferentially spaced splines adapted to mate with said splines on said reagent container for rotating said reagent container relative to said base upon rotation of said drive means.

25. A reagent metering and delivery device for delivering precise quantities of reagent comprising:

(a) an internally threaded hollow base member having a bottom closure wall;

(b) a hollow stator rigidly mounted within said base member;

(c) a disposable assembly for containing a selected reagent comprising;

(i) an externally threaded reagent container adapted to be threadably interconnected with said base member upon rotation of said reagent container relative to said base member, said reagent container having a top closure wall and a generally cylindrical inner wall;

(ii) fluid delivery means for conducting fluid from the interior of said reagent container to the exterior of the device, and (iii) a non-rotatable plunger captively carried in and simultaneously reciprocally and rotationally movable relative to said reagent container only upon rotation of said reagent container relative to said base member, said plunger including a fluid passageway having one end communicating with the interior of said reagent container and another end communicating with said delivery means, said fluid delivery means comprising a tubular member communicating with said fluid passageway of said plunger and extending through said hollow stator to the exterior of said base member and, said plunger having:

(aa) sealing means adapted to sealably engage said inner wall of said reagent container for preventing leakage of fluid between said plunger and said inner wall upon axial movement of said plunger within said reagent container; and (bb) connecting means for removably interconnecting said plunger with said stator for preventing rotation of said plunger relative to said inner wall of said base member upon rotation of said reagent container relative to said base member.

* * * * *